United States Patent [19]

Malric

[11] 4,424,280

[45] Jan. 3, 1984

[54] CERAMIC FOAMS AND PROCESS OF PREPARING THE SAME

[75] Inventor: Henri-Bernard Malric, Cap Rouge, Canada

[73] Assignee: Centre de Recherche Industrielle du Quebec, Ste-Foy, Canada

[21] Appl. No.: 308,617

[22] Filed: Oct. 5, 1981

[30] Foreign Application Priority Data

May 27, 1981 [CA] Canada ................................. 378467

[51] Int. Cl.$^3$ ...................... C04B 21/02; C04B 43/02; C04B 43/10
[52] U.S. Cl. ...................................... 501/84; 264/63; 501/85
[58] Field of Search ...................... 501/84, 85; 264/43

[56] References Cited

U.S. PATENT DOCUMENTS 4,123,284 10/1978 Rieger .................................. 501/84

FOREIGN PATENT DOCUMENTS 2093133 1/1972 France .
2365536 4/1978 France .

*Primary Examiner*—Helen M. McCarthy
*Attorney, Agent, or Firm*—Schwartz, Jeffery, Schwaab, Mack, Blumenthal & Koch

[57] ABSTRACT

The disclosure describes ceramic foams, for example made of clay, and a process for preparing these foams. Once there is obtained a mixture defining a slip, the latter is caused to be foamed by the addition of controlled quantities of a gas, such as air, thus making it possible to reproduce foams having predetermined physical properties. It is preferable to dry the foam under conditions where the temperature is heterogeneous and in the absence of ventilation. This operation can be carried out by placing the foam under heating elements at a temperature between 30° C. at the start to 100° C. towards the end of the drying, while practically preventing any ventilation in the vicinity of the foam. This process is mainly advantageous in that it enables one to control the physical properties of the foam obtained thereby. This foam can be used as an industrial absorbent, acoustical insulating material, fire-wall, thermal insulating material, etc. by varying the density of the foam.

35 Claims, No Drawings

CERAMIC FOAMS AND PROCESS OF PREPARING THE SAME

BACKGROUND OF THE INVENTION (a) Field of the Invention

The invention is directed to ceramic foams as well as a process for the preparation of these foams. More specifically, the invention is concerned with the preparation of foams made of clay which can eventually be used as industrial absorbent, such as animal litters, acoustical insulating material, firewall, heat-insulating material, etc.

(b) Description of the Prior Art

French Patent No. 2,093,133 which is owned by the Centre Technique des Tuiles et Briques, and which was published on Jan. 28, 1972, describes a foaming clay composition and two processes of preparing products with baked clay. In the two cases, the clay to which a foaming agent has been added is strongly agitated. French Patent No. 2,365,536, which is owned by Societe Anonyme dite: Tuileries Huguenot-Fenal, which was published on Apr. 21, 1978, describes an improvement to the process of French Patent No. 2,093,133. The improvement consists in adding ashes and a foaming agent under slight stirring while the mixture which is finally obtained is subjected to strong agitation.

These two processes of preparing foams made of clay have been abandoned a few years ago for two main reasons. First, the foams which are obtained lack mechanical resistance and second, there are great difficulties to control the density of the final product.

It is therefore realized that there is a real need to improve the two processes mentioned above in order to obtain products in which the properties are controlled while the foams obtained possess sufficient mechanical resistance.

SUMMARY OF THE INVENTION

In order to overcome the above difficulties, there is now provided a process of preparing ceramic foams in which a slip is prepared first, which slip can thereafter be foamed, dried and baked. The process is characterized by the fact that the slip is foamed while adding controlled quantities of a gas, thereby enabling the reproductiveness of foams having predetermined physical properties.

DESCRIPTION OF PREFERRED EMBODIMENTS

The foams are preferably dried under conditions where the temperature is heterogeneous around the foams. Under these conditions, drying is preferably carried out in the absence of any ventilation. It is possible to maintain a heterogeneous temperature around the foams by applying the temperature on one of the surfaces of the foams only. Preferably, the application of the temperature is restricted to the upper surface of the foams.

An interesting embodiment for drying the foams by the process according to the invention is to use heating lamps which are placed in the immediate vicinity of at least one of the surfaces of the foams.

Therefore, a homogeneous temperature around the foam should be prevented: Preferably, the temperature should only be applied on the upper surface of the foam, while the latter is inside the dryer. The temperature preferably varies between 30° C. at the start of the process, to 100° C. towards the end.

In practice, the foams are dried by disposing the latter under heating lamps at a temperature which varies between 30° C. at the start to 45° C. towards the end of the drying, while practically preventing any ventilation in the vicinity of the foams.

It has been indicated above that the foaming is mainly due to the addition of controlled quantities of a gas. Although these quantities can vary, within reasonable limits, it is understood that the quantities which are introduced are dependent on the density of the foams which one wishes to obtain. Therefore, the higher the density, the lesser quantity of gas will be introduced.

In practice, the gas which is introduced obviously consists of air. However, depending on circumstances, any other inert gas can be used.

In practice, sufficient air will be introduced into the foams in order that the latter reach a density between about 0.3 and about 1.2. Therefore, if one wishes to obtain an industrial absorbent, such as a litter, the density of the foam would be controlled to between 1 and 1.2. In the case of an acoustic insulating material, the density will be between 0.6 and 0.8. For a fire-wall, the density will vary between 0.8 and 1.2. Finally, when one wishes to obtain a heat-insulating material, the density of the foam will be adjusted to between 0.3 and 0.6.

In practice, the addition of controlled quantities of a gas, such as air, to the slip, is carried out by mechanically stirring the slip so as to prevent the introduction of appreciable quantities of ambient air into the slip, while maintaining the latter in movement, for the only purpose of homogenizing the mixture. With respect to the air which is required to produce the foam, it is essentially introduced inside the slip in movement. For example, the slip is prepared in some kind of container, and the mechanical agitation of the latter is carried out by means of an agitator which operates at variable speeds and which is provided with a four-blade propeller which projects the foam towards the periphery of the container without breaking it.

With respect to the air which is introduced into the mixture, it is preferably introduced through the bottom of the container.

Even though a large number of starting materials can be used provided a ceramic foam can be obtained, it is much preferred to use clay. In this case, the slip is made of a mixture of clay and water. It has been observed that, under ideal conditions, the process should be carried out with a slip which is self-flowing at the end of the process. This implies that the final water content should be regulated with precision. It is generally in the vicinity of 50% with respect to the weight of the solid materials. It has been observed that it is possible to obtain a foam which is very stable to drying and with a texture which is fine and very regular after baking, if the starting material which is used is feldspathic kaolin of Chateau Richer, Province of Quebec, Canada. This material also gives a good resistance to thermal shocks and has a wide range of baking. The colors obtained are particularly nice and easy to modify: For example, the material can be demagnetized to obtain a clear color or it is possible to add various oxides to give particular shades.

Even though the foaming agents are well known in the art, and notwithstanding the fact that the choice of a foaming agent is not critical, it is preferable to use sodium dodecyl benzene sulfonate which gives the best results. This foaming agent is used in amounts which preferably vary between 2.5 and 7.0% with respect to the weight of the solid materials.

In order to give more resistance after drying, it is recommended to add methyl cellulose or a lignosulfonate to the water which constitutes the slip. The methyl cellulose facilitates the preparation of the foam by adjusting the viscosity, thereby giving a very good resistance after drying, but, on the other hand, it makes for a more difficult drying. On the other hand, the lignosulfonate gives less resistance after drying than methyl cellulose, but results in an easier drying and is very inexpensive. The preferred quantities of methyl cellulose are generally in the vicinity of 0.5% by weight while if lignosulfonate is used, the amount of this binder will preferably be between 2 and 5%. It has been observed that by adding a mica, for example 5% by weight, in the mixture, there will be a definite improvement in the texture and the stability of the foam. According to a preferred embodiment of the invention, kaolin is added to the slip. For example, an addition of only 10% of kaolin to the basic mixtures of feldspathic kaolin of Chateau Richer results in a finer porosity and a foam which has a more closed texture. The result is that we have a higher mechanical resistance but drying is more complicated.

According to another embodiment of the invention, it has been noted that the addition of fibreglass to the foam in amounts varying between 0.1 to 0.5% with respect to the weight of the solid materials, generally produces a network which gives a good stability during drying. Generally, between 0.2 and 0.3% of fiberglass will be used in the slip.

It has been mentioned above that the drying is carried out preferably under heating lamps. This system permits the drying of most of the mixtures without breaks and collapsing.

On the other hand, it has been realized that the time of drying of ceramic foams, such as clay foams, is very high compared to a high density ceramic body and that the slightest ventilation, mainly at the start, causes an immediate rupture of the voids in the center of the sample thereby creating a cavity and numerous cleavage planes which are parallel to the surface. This is the reason why it is highly recommended to dry the mixture in the absence of any ventilation. A foam 35 mm thich dried under the lamp at a temperature of 35° to 40° C. loses 95% of its water during about 5 hours, which is sufficiently rapid.

The baking temperature obviously depends on the type of starting mixture. The baking cycle can be relatively rapid since the texture of the foam provides good resistance to thermal shocks. The time of baking should however be sufficiently long because of the insulating nature of the material (2 hours in the case of 35 mm).

There will be given below, with reference to Table I, 18 examples showing various mixtures. All these mixtures have given satisfactory results.

TABLE I
MIXTURES GIVING SATISFACTORY RESULTS

| NO | Kaolin Chateau Richer | Clay East Angus | Clay East Angus roasted | Residue SKW | Kaolin | Suzorite | Talc | Glass Fibers | Siponate DS-4 | 2% additive A | 5% additive A | 0.5% methocel | Baking Temp. in °C. (2 hours) | Apparent Density | Colors | Remarks |
|---|---|---|---|---|---|---|---|---|---|---|---|---|---|---|---|---|
| 1 |  | 50 | 50 |  |  |  |  | 0.5 | 5 | 45 |  |  | 1100 | 0.81 | reddish brown | Good glazing |
| 2 |  | 45 | 45 |  |  |  |  | 0.5 | 5 | 50 |  |  | 1100 | 0.78 | brown | More glazed and finer texture than No. 1 |
| 3 | 50 | 25 | 25 |  |  | 10 |  | 0.5 | 5 | 45 |  |  | 1100 | 0.49 | reddish brown | Coarser texture. Less baked than No. 1 |
| 4 | 50 | 50 |  |  |  |  |  | 0.5 | 5 | 45 |  |  | 1100 | 0.55 | reddish brown | As No. 3 |
| 5 | 50 | 50 |  |  |  |  |  | 0.5 | 5 | 45 |  |  | 1100 | 0.50 | reddish brown | As No. 3. Very slight shrinkage |
| 6 | 45 | 25 | 25 |  |  | 5 |  | 0.5 | 5 | 45 |  |  | 1100 | 0.65 | brown to reddish brown | Better baked than No. 3, same texture. |
| 7 | 75 | 25 |  |  |  |  |  | 0.5 | 5 | 45 |  |  | 1150 | 0.49 | light brown | Texture and baking as No. 3. |
| 8 | 46.5 | 46.5 |  |  |  |  | 7 | 0.5 | 5 | 45 |  |  | 1100 | 0.49 | light reddish brown | Texture and baking as No. 3 |
| 9 | 100 |  |  |  |  |  |  | 0.5 | 5 | 40 |  |  | 1200 | 0.56 | orange | Finer texture than No. 3 - could be more glazed. |
| 10 | 100 |  |  |  |  |  |  | 0.4 | 3 |  | 50 |  | 1200 | 0.64 | orange | Texture a bit finer than No. 9 |
| 11 | 100 |  |  |  |  |  |  | 0.4 | 3 |  |  | 50 | 1225 | 0.62 | orange | Fine texture. Well baked. |
| 12 | 100 |  |  |  |  |  |  | 0.4 | 3 |  |  | 50 | 1225 | 0.84 | orange | Very fine and very resistant |
| 13 | 90 | 10 |  |  |  |  |  | 0.5 | 5 |  | 45 |  | 1150 | 0.67 | very light brown | Fine and regular texture. Well baked |
| 14 | 75 |  |  |  |  |  | 25 | 0.5 | 5 | 45 |  |  | 1150 | 0.76 | greyish brown | Coarse texture. Well baked. Important shrinkage. |
| 15 | 50 |  |  | 50 |  |  |  | 0.45 | 5 |  |  | 55 | 1200 | 0.68 | light grey | Regular texture. Well baked. |
| 16 | 45 |  |  | 45 |  | 10 |  | 0.45 | 5 |  |  | 60 | 1200 | 0.60 | dark grey | Regular texture. Glazed. Very hard. |
| 17 | 90 |  |  |  | 10 |  |  | 0.4 | 3 |  |  | 55 | 1225 | 0.76 | pink beige | Very regular texture. Very hard. |
| 18 | 75 |  |  |  | 25 |  |  | 0.4 | 3 |  |  | 50 | 1225 | 0.76 | blueish grey | As No. 17. Contains 0.5% COco3 |

NOTE:
The % of glass fibers, of foaming agent (siponate DS-4) and water are given with respect to the total weight of the other materials.
A: lignosulfonate In order to measure the mechanical, thermal and acoustical properties, and to establish technical data permitting the comparison between the products of the invention and those manufactured in France by the teaching of French Patent No. 2,093,133, two series of samples have been prepared starting from the following mixtures:

| Sample No. 1 | |
|---|---|
| Chateâu Richer | 4710 g |
| Fiberglass | 18 g |
| Sodium dodecyl benzene sulfonate | 180 g |
| Water containing 3% lignosol | 300 cc |

Drying was carried out in a non-ventilated oven at 40° C. during about 12 hours and baking was carried out at 1260° C. during 2 hours.

There was obtained a very open foam, with coarse texture, having an apparent density equal to 0.57 g/cc.

| Sample No. 2 | |
|---|---|
| Chateâu-Richer | 5000 g |
| Fiberglass | 15 g |
| Sodium dodecyl benzene sulfonate | 150 g |
| Water containing 3% lignosol | 2500 cc |

Drying was carried out as in the case of Sample No. 1, baking at a temperature of 1225° C. during 2 hours.

There was obtained a foam with a finer texture, with pores which were more closed, having an apparent density of 0.59 g/cc.

The results of the measurements of the mechanical properties are given in Table II following. The values for a French foam are given by way of comparison.

TABLE II

MECHANICAL PROPERTIES

| SAMPLE | DENSITY g/cc | STRESS RESISTANCE kg/cm² | psi | RESISTANCE TO COMPRESSION kg/cm² | psi |
|---|---|---|---|---|---|
| No. 1 | 0.57 | 12.5 | 177 | 20 | 284 |
| No. 2 | 0.59 | 24.4 | 346 | 50 | 710 |
| Foam Guiraud (2,093,133) | 0.7 to 0.8 | 3 to 8 | 45 to 130 | 15 to 25 | 225 to 375 |

It will be noted that the mechanical properties are substantially improved with respect to the foam which is sold by Guiraud.

The thermal conductivity has been measured on the apparatus "Rapid-K" on plates measuring 300×300×35 mm. The results are given in Table III.

TABLE III

MECHANICAL PROPERTIES AT 20° C.

| SAMPLE | DENSITY | THERMAL CONDUCTIVITY k $\frac{BTU \times po}{h \times pi^2 \times °F.}$ | $\frac{watt}{m \times °C.}$ | THERMAL RESISTANCE R per INCH OF THICKNESS |
|---|---|---|---|---|
| No. 1 | 0.57 | 0.856 | 0.123 | 1.17 |
| No. 2 | 0.59 | 0.922 | 0.133 | 1.08 |
| Foam Guiraud (2,093,133) | 0.8 | 1.25 | 0.18 | 0.8 |

These results are in agreement with those which would be expected as a function of the density of the product.

The acoustical absorption has been measured with the Kundt tube only, because, for the time being, the necessary equipment to prepare plates of sufficient dimensions to be able to make measurements in a reverberating chamber is not available.

Measurements were made without air foil behind the sample. The presence of such an air foil would have improved the performance of the material.

The results are given in Table IV with some values for a French foam.

TABLE IV

ACOUSTICAL ABSORPTION MEASURED ON A KUNDT TUBE (COEFFICIENT α OF SABINE)

| FREQUENCY HERTZ | SAMPLE NO. 1 | | | SAMPLE NO. 2 | | | FOAM GUIRAUD DENSITY 0.55 THICKNESS |
|---|---|---|---|---|---|---|---|
| | 32 mm | 64 mm | 95 mm | 32 mm | 64 mm | 95 mm | 80 mm |
| 125 | 0.05 | 0.11 | 0.28 | 0.06 | 0.20 | 0.46 | — |
| 250 | 0.11 | 0.32 | 0.60 | 0.15 | 0.54 | 0.80 | 0.75 |
| 500 | 0.20 | 0.77 | 0.99 | 0.43 | 0.88 | 0.75 | 0.65 |
| 1000 | 0.53 | 0.90 | 0.64 | 0.91 | 0.63 | 0.78 | 0.70 |
| 2000 | 0.95 | 0.73 | 0.70 | 0.80 | — | — | 0.77 |
| 4000 | 0.69 | 0.88 | 0.87 | 0.80 | — | — | 0.78 |

These results confirm the excellent acoustical absorption of the clay foam.

An important difference was observed between the performance of the two samples. This confirms the importance of the texture on the acoustical absorption properties since this is the only parameter which differs substantially in the present case.

I claim:

1. A process for preparing a clay foam in which a slip is prepared which is thereafter foamed, dried and baked, which comprises mechanically stirring the slip merely sufficiently to provide homogeneous conditions thereon, and controlling said stirring so as to prevent the introduction thereby of substantial quantities of ambient air into said slip, and independently of the introduction of any quantity of ambient air by said mechanical stirring, simultaneously introducing essentially within said slip in movement controlled quantities of a gas thereby ensuring the reproductiveness of a foam having predetermined physical properties, said slip being self flowing at the end of said process, said process being further characterized by drying the foam under conditions where temperature is heterogeneous around said foam and ventilation is practically prevented in the vicinity of said foam.

2. A process according to claim 1, wherein the drying is carried out in the absence of ventilation.

3. A process according to claim 1, wherein a heterogeneous temperature is maintained around said foam by applying the temperature only on at least one of the surfaces of said foam.

4. A process according to claim 3, wherein the application of the temperature is restricted to the upper surface of said foam.

5. A process according to claim 3, wherein the drying of the foam is carried out by means of heating lamps which are located in the immediate vicinity of at least one of the surfaces of said foam.

6. A process according to claim 1, wherein the drying temperature varies between 30° C. at the start and 100° C. at the end.

7. A process according to claim 4, wherein the drying of the foam is carried out by placing the latter under heating lamps at a temperature between 30° C. at the start and 45° C. towards the end of the drying while practically preventing any ventilation in the vicinity of said foam.

8. A process according to claim 1, wherein the quantities of gas introduced are dependent on the density of the foam which is required.

9. A process according to claim 8, wherein the gas introduced consists of air.

10. A process according to claim 8, wherein the foam has a density between about 0.3 and about 1.2.

11. A process according to claim 8, wherein the foam has a density between about 1 and about 1.2.

12. A process according to claim 8, wherein the foam has a density between about 0.6 and about 0.8.

13. A process according to claim 8, wherein the foam has a density between about 0.8 and about 1.2.

14. A process according to claim 8, wherein the foam has a density between about 0.3 and about 0.6.

15. A process according to claim 1, wherein the slip is prepared in a container, the mechanical stirring of said slip is carried out by means of a variable speed stirrer provided with a blade which projects the foam on the periphery of the container.

16. A process according to claim 1, wherein the slip contains about 50% water with respect to the weight of the solids.

17. A process according to claim 1, wherein the clay starting material constituting the slip is feldspathic kaolin of Chateâu Richer.

18. A process according to claim 15, wherein the slip contains a foaming agent.

19. A process according to claim 18, wherein the foaming agent is present in the slip in amounts ranging between 2.5 and 7.0% by weight with respect to the solids.

20. A process according to claim 1, wherein the slip contains a binder.

21. A process according to claim 20, wherein the binder is selected from the group consisting of lignosulfonate and methyl cellulose.

22. A process according to claim 1, comprising adding mica to the slip.

23. A process according to claim 22, wherein the slip contains at least 5% by weight of mica.

24. A process according to claim 1, wherein the clay slip contains at least 10% kaolin.

25. A process according to claim 1, which comprises adding fiberglass to the slip.

26. A process according to claim 25, wherein the slip contains 0.1 to 0.5% fiberglass with respect to the weight of solids.

27. A process according to claim 25, wherein the slip contains 0.2 to 0.3% fiberglass with respect to the weight of solids.

28. A clay foam characterized by the fact that it has been obtained by the process according to claim 1.

29. A clay foam according to claim 28, characterized by the fact that it has a density between about 0.3 and about 1.2.

30. A clay foam obtained by the process according to claim 11, which has a density varying between 1.0 and 1.2 and constituting an industrial absorbent.

31. A clay foam obtained by the process according to claim 12, characterized by the fact that it has a density varying between 0.6 and 0.8 and constituting an acoustical insulating material.

32. A clay foam obtained by the process according to claim 13, characterized by the fact that it has a density varying between about 0.8 and 1.2 and constituting a fire-wall.

33. A clay foam obtained by the process according to claim 14, characterized by the fact that it has a density varying between 0.3 and 0.6 and constituting a thermal insulating material.

34. A process for preparing a clay foam, comprising the following steps:
   a. feldspathic kaolin of Château Richer is mixed with about 50% by weight of water in order to obtain a slip;
   b. about 2.5 to 7% by weight of a foaming agent is added to the slip;
   c. stirring the slip obtained in b. in a container by means of a variable speed stirrer provided with a blade which projects the foam on the periphery of the container without breaking the foam and provides homogeneous conditions therein, and controlling said stirring so as to prevent the introduction thereby of substantial quantities of ambient air into said slip;
   d. independently of the introduction of any quantity of ambient air by said mechanical stirring simultaneously introducing essentially within said slip in movement, controlled quantities of air so as to obtain foam densities varying between 0.3 and 1.2;
   e. the foam is dried by placing the latter under heating lamps at a temperature varying between 30° C. at the start and 45° C. towards the end of the drying while substantially preventing any ventilation in the vicinity of said foam; and
   f. baking the dried foam.

35. A clay foam characterized by the fact that it has been obtained by the process according to claim 34.

* * * * *